United States Patent
Callahan et al.

(10) Patent No.: US 11,465,771 B2
(45) Date of Patent: Oct. 11, 2022

(54) FLIGHT CONTROL POSITION SENSOR

(71) Applicant: THE BOEING COMPANY, Chicago, IL (US)

(72) Inventors: Kevin S. Callahan, Shoreline, WA (US); Pierce Nichols, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 1049 days.

(21) Appl. No.: 16/136,879

(22) Filed: Sep. 20, 2018

(65) Prior Publication Data
US 2020/0094944 A1 Mar. 26, 2020

(51) Int. Cl.
*B64D 45/00* (2006.01)
*B64C 13/30* (2006.01)
*G01B 7/02* (2006.01)
*G01B 11/02* (2006.01)

(52) U.S. Cl.
CPC .......... *B64D 45/0005* (2013.01); *B64C 13/30* (2013.01); *G01B 7/02* (2013.01); *G01B 11/02* (2013.01)

(58) Field of Classification Search
USPC .......... 33/706, 1 N, 1 PT, 707, 708
See application file for complete search history.

(56) References Cited

U.S. PATENT DOCUMENTS

| | | | | |
|---|---|---|---|---|
| 4,035,922 | A * | 7/1977 | von Voros | G01B 11/02 33/802 |
| 6,629,371 | B1 * | 10/2003 | Shirai | G01C 1/02 33/290 |
| 6,640,451 | B1 * | 11/2003 | Vinarcik | G01D 5/2013 33/DIG. 1 |
| 6,922,899 | B2 * | 8/2005 | Nakamura | G01D 18/001 33/1 PT |
| 7,007,399 | B2 * | 3/2006 | Catalano | H02G 1/086 33/735 |
| 7,199,355 | B2 * | 4/2007 | Lippuner | G01D 5/34707 341/13 |
| 7,644,505 | B2 * | 1/2010 | Zeng | G01C 15/06 33/707 |
| 8,169,214 | B2 * | 5/2012 | Zak | G01P 3/487 702/145 |
| 10,913,527 | B2 * | 2/2021 | Huynh | G07C 5/0808 |
| 2004/0172835 | A1 * | 9/2004 | Klarer | G01B 5/255 33/203 |
| 2008/0202862 | A1 * | 8/2008 | Dudde | B66B 1/3492 33/706 |
| 2011/0210238 | A1 * | 9/2011 | An | G01D 5/3473 250/231.16 |

FOREIGN PATENT DOCUMENTS

CN 111486811 B * 1/2022 ............. G01B 11/26

* cited by examiner

*Primary Examiner* — Christopher W Fulton
(74) *Attorney, Agent, or Firm* — Marshall, Gerstein & Borun LLP (57) ABSTRACT

A flight control surface position sensor assembly for an aircraft including a position indicator positioned on a pulley wherein the pulley is secured to the aircraft and the pulley engages a cable associated with a flight control surface of the aircraft. The flight control surface position sensor assembly further includes a sensor which senses rotation of the position indicator with rotation of the pulley.

20 Claims, 6 Drawing Sheets

FIG. 6

FLIGHT CONTROL POSITION SENSOR

FIELD

This disclosure relates to a pulley assembly and more particularly to a pulley assembly associated with movement of a flight control surface.

BACKGROUND

There is a need to estimate a control surface position on an aircraft whether the aircraft is manned or unmanned. The sensing of the control surface position needs to be accomplished without application of sensing equipment that is cumbersome and/or that would add undesirable weight to the aircraft. Should the sensing equipment be associated with a control system, which imparts movement to the control surface such as with a pulley and cable assembly, the pulley and cable assembly is often positioned within close confinements within the aircraft structure with pulleys often secured to fixed structures within the aircraft structure. As a result, should the control system be utilized with respect to estimating a control surface position, there is a need to employ sensing equipment, which does not require changing the control system and which can accommodate confined environments.

SUMMARY

An example includes a flight control surface position sensor assembly for an aircraft including a position indicator positioned on a pulley wherein the pulley is secured to the aircraft and the pulley engages a cable associated with a flight control surface of the aircraft. The flight control surface position sensor further includes a sensor which senses rotation of the position indicator with rotation of the pulley.

An example includes a method for sensing a flight control surface position of an aircraft including the step of positioning a position indicator onto a pulley, wherein the pulley is secured to the aircraft and the pulley engages a cable associated with a flight control surface of the aircraft. The method further includes positioning a sensor aligned with the position indicator wherein the sensor senses rotation of the position indicator with rotation of the pulley.

The features, functions, and advantages that have been discussed can be achieved independently in various examples or may be combined in yet other examples further details of which can be seen with reference to the following description and drawings.

DESCRIPTION

Figure 1:
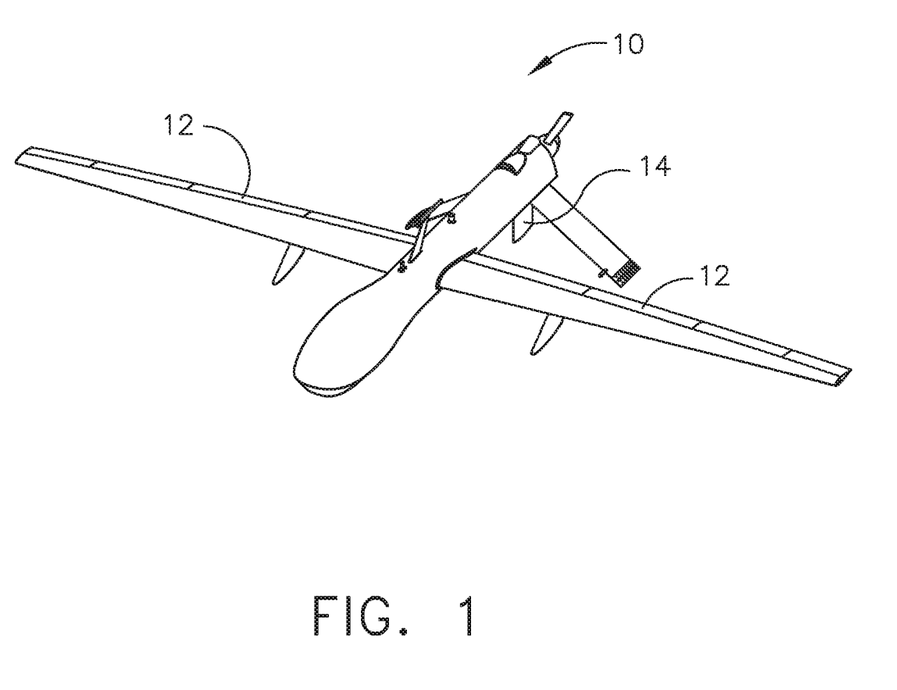
FIG. 1 is a perspective view of an aircraft.
Figure 2:
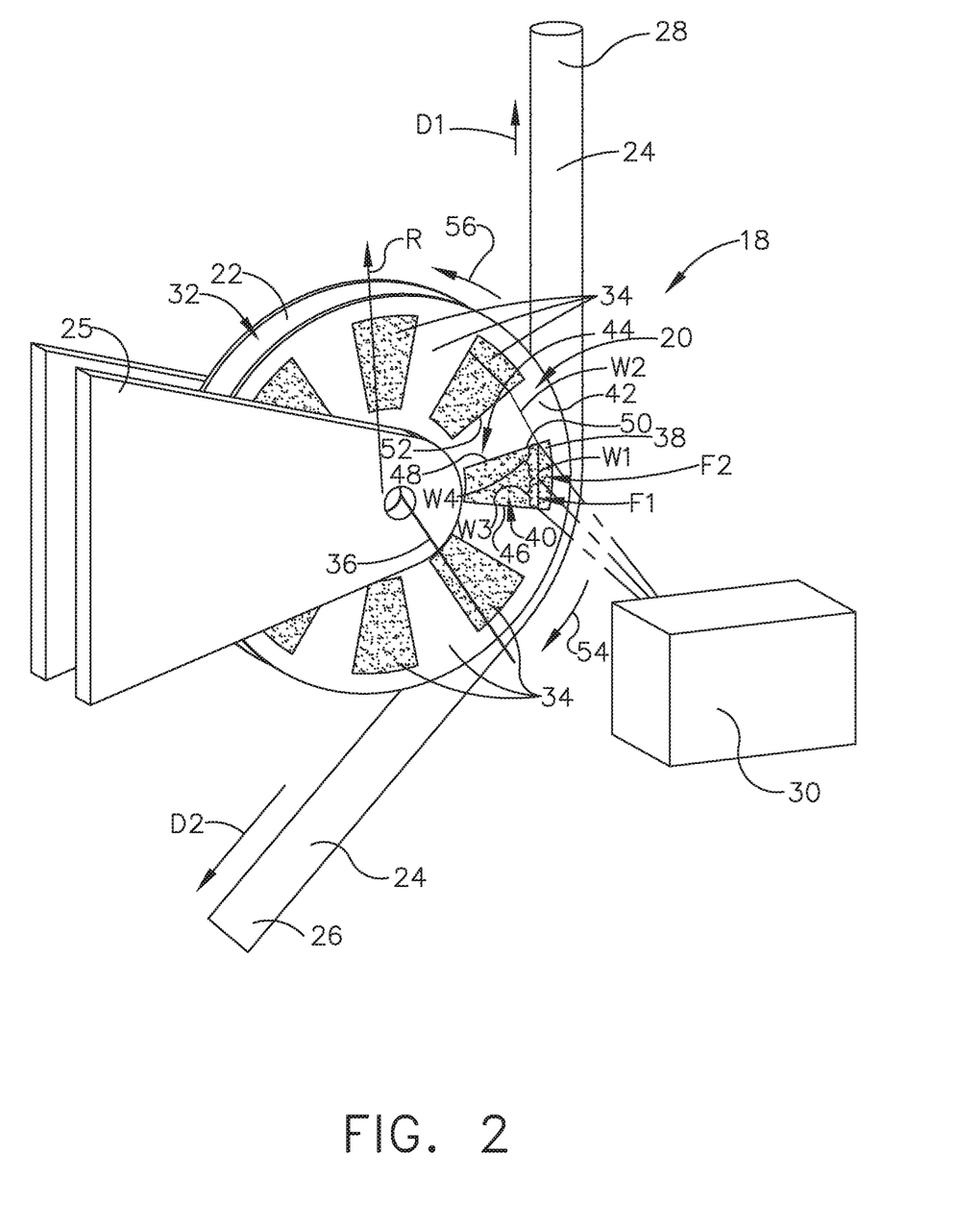
FIG. 2 is a partial perspective view of a first example of the flight control surface position sensor assembly with a cable of the flight control assembly in a first position.

In referring to FIG. 1, aircraft 10 in this example is an unmanned aircraft shown in flight operation. The disclosure described herein is applicable to a flight control surface position sensor assembly for sensing positions of control surfaces of either unmanned or manned aircraft 10. Flight control surfaces include, for example, ailerons 12 or rudder 14, which provides the pilot the ability to control the attitude of aircraft 10 during flight operations. Flight control surface position sensor assembly 18, as seen in FIG. 2, can provide the pilot controlling the flight operations of aircraft 10 position information related to a control surface of aircraft 10.

In referring to FIGS. 2 and 3, a first example of flight control surface position sensor assembly 18 for aircraft 10 is shown, which includes position indicator 20, which will be discussed in further detail herein, positioned on pulley 22. In this example, pulley 22 is secured to aircraft 10 with bracket 25 permitting pulley 22 to rotate. Pulley 22 engages cable 24 associated with flight control surface (not shown in FIGS. 2 and 3), which can include for example ailerons 16 or rudder 18 as seen in FIG. 1. In this example, cable 24 has first end portion 26 and second end portion 28. First end portion 26 is connected to a motor (not shown) which can move cable 24 in either direction in which cable 24 extends such as in a forward direction D1 or in a reverse direction D2. Second end portion 28 is connected to a control surface of aircraft 10 and operates the position of the control surface with movement of cable 24 as desired in a forward direction D1 or a reverse direction D2. Flight control surface position sensor assembly 18 further includes sensor 30, which senses rotation of position indicator 20 with rotation of pulley 22.

In operation of the control surface of aircraft 10, cable 24 maintains a taught relationship with respect to pulley 22, such that with movement of cable 24 in either the forward direction D1 or in the reverse direction D2, cable 24 maintains frictional engagement with groove 32 of pulley 22 and slippage of cable 24 relative to groove 32 of pulley 22 is avoided. Without slippage, rotational movement of pulley 22 correlates to the linear travel of cable 24.

Position indicator 20 includes plurality of adjacent portions 34 of the position indicator 20 positioned circumferentially about central axis of rotation 36 of pulley 22. In a first example of flight control surface position sensor assembly 18, first portion 38 of the plurality of adjacent portions 34 has a first visual appearance 40 and second portion 42, adjacent to first portion 38, has a second visual appearance 44 different from first visual appearance 40 of first portion 38. This pattern of adjacent differing visual appearances of the plurality of adjacent portions 34 is repeated about the circumference of pulley 22. In one example, first visual appearance 40 of first portion 38 of plurality of adjacent portions 34 is a first color and second visual appearance 44 of second portion 42 of plurality of adjacent portions 34 is a second color. In another example, first visual appearance 40 of first portion 38 is black and second visual appearance 44 of second portion 42 is white.

There are numerous ways to employ plurality of adjacent portions 34 with respect to pulley 22. For example, a film can be used to carry the first and second visual appearances 40 and 44. The film can be configured, for example, to be a decal wherein the plurality of adjacent portions 34 are configured with a dye coloration that would be different for first portion 38 and second portion 42 so as to create different visual appearances. Other configurations of employing the plurality of adjacent portions 34 can be provided with use of a dye in first portion 38 for example and the film can be clear in second portion 42, so long as a difference in visual appearance or optical appearance is created by adjacent first portion 38 and second portion 42. The clear section can then provide the visual appearance of pulley 22. The decal can be adhered to pulley 22 with a contact adhesive without altering any operational configuration of pulley 22 and/or cable 24. Other applications of providing different visual appearances of adjacent portions of first and second portions 38 and 42 can include applying a different of color paint directly to pulley 22 or with sectional pieces of film carrying the plurality of adjacent portions 34 wherein adjacent portions would be of a different visual appearance.

Figure 3:
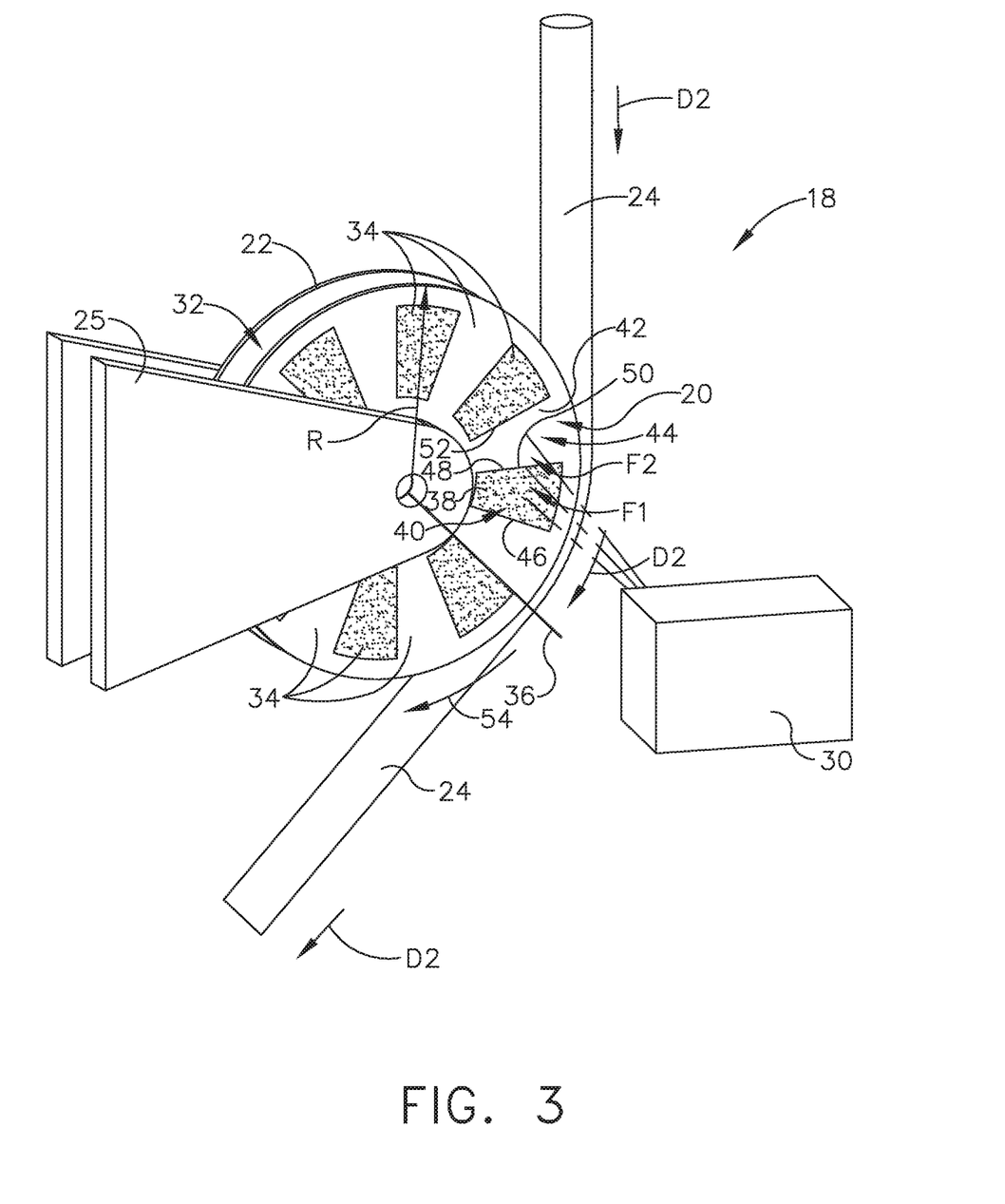
FIG. 3 is a partial perspective view of the first example of the flight control surface position sensor assembly of FIG. 2 with a cable of the flight control assembly moving from the first position.

As shown in FIGS. 2 and 3, position indicator 20 includes plurality of adjacent portions 34 wherein adjacent portions 34 contrasting in visual appearance. First portion 38 of the plurality of adjacent portions 34 includes first edge 46 and second edge 48 spaced apart from first edge 46. First and second edges 46, 48 of first portion 38, of the plurality of adjacent portions 34, extend in radial direction R relative to central axis of rotation 36 of pulley 22. Second portion 42 of the plurality of adjacent portions 34 includes first edge 50, which abuts and extends along second edge 48 of first portion 38, and second edge 52 of second portion 42 is spaced apart from first edge 50. First and second edges 50, 52 of second portion 42 of the plurality of adjacent portions 34 extend in radial direction R relative to central axis of rotation 36 of pulley 22. This configuration provides clear radial extending edges for first and second portions 38 and 42 with respect to the differing visual appearance between first and second portions 38 and 42.

First portion 38 of the plurality of adjacent portions 34 includes first width dimension W1 and second portion 42 of the plurality of adjacent portions 34 includes second width dimension W2, which are equal having the same dimension. Sensor 30 is an optical sensor, as seen in FIGS. 2 and 3, which includes first optical sensing field F1 and second optical sensing field F2 wherein first and second optical sensing fields F1 and F2 are positioned adjacent to one another. First optical sensing field F1 has a width dimension W3 equal to one half first width dimension W1 of the first portion 38 or one half second width dimension W2 of the second portion 42. Second optical sensing field F2 has a width dimension W4 equal to one half first width dimension W1 of the first portion 38 or one half second width dimension W2 of the second portion 42. With sensor 30 having two adjacent sensing fields F1 and F2 having an overall width dimension including width dimension W3 and width dimension W4, which added together, equals first width dimension W1 of first portion 38 and likewise can equal second width dimension W2 of second portion 42, direction of rotation of pulley 22 can be sensed in this first example of flight control surface position sensor assembly 18.

Sensing direction of rotation of pulley 22 for example can be seen in FIGS. 2 and 3. With pulley 22 rotating and coming into alignment with first portion 38, as seen in FIG. 2, sensor 30 senses both first and second optical sensing fields F1 and F2 to have the same visual or optical appearance. Should sensor 30 sense field F2 to next have a lighter visual appearance than field F1, pulley 22 as seen in FIG. 3 is moving in a clockwise direction 54. In contrast, should sensor 30 sense field F1 to have a lighter visual appearance while sensor 30 senses the visual appearance in field F2 remains darker, pulley 22 would be sensed as rotating in a counter clockwise direction 56, as identified in FIG. 2.

As a result, with a width dimension of each of the plurality of adjacent portions 34 known and with the above described configuration of sensing fields F1 and F2 of sensor 30, flight control surface position sensor assembly 18 can track the linear travel of cable 24 and the direction of travel of cable 24 such as, for example, in reverse direction D2 seen in FIG. 3 and similarly can do the same with respect to forward direction D1. In addition, with calibrating a control surface position with sensor 30, the direction of travel of the control surface can be sensed by sensor 30 and the amount the control surface has traveled from a known position is also sensed.

Figure 4:
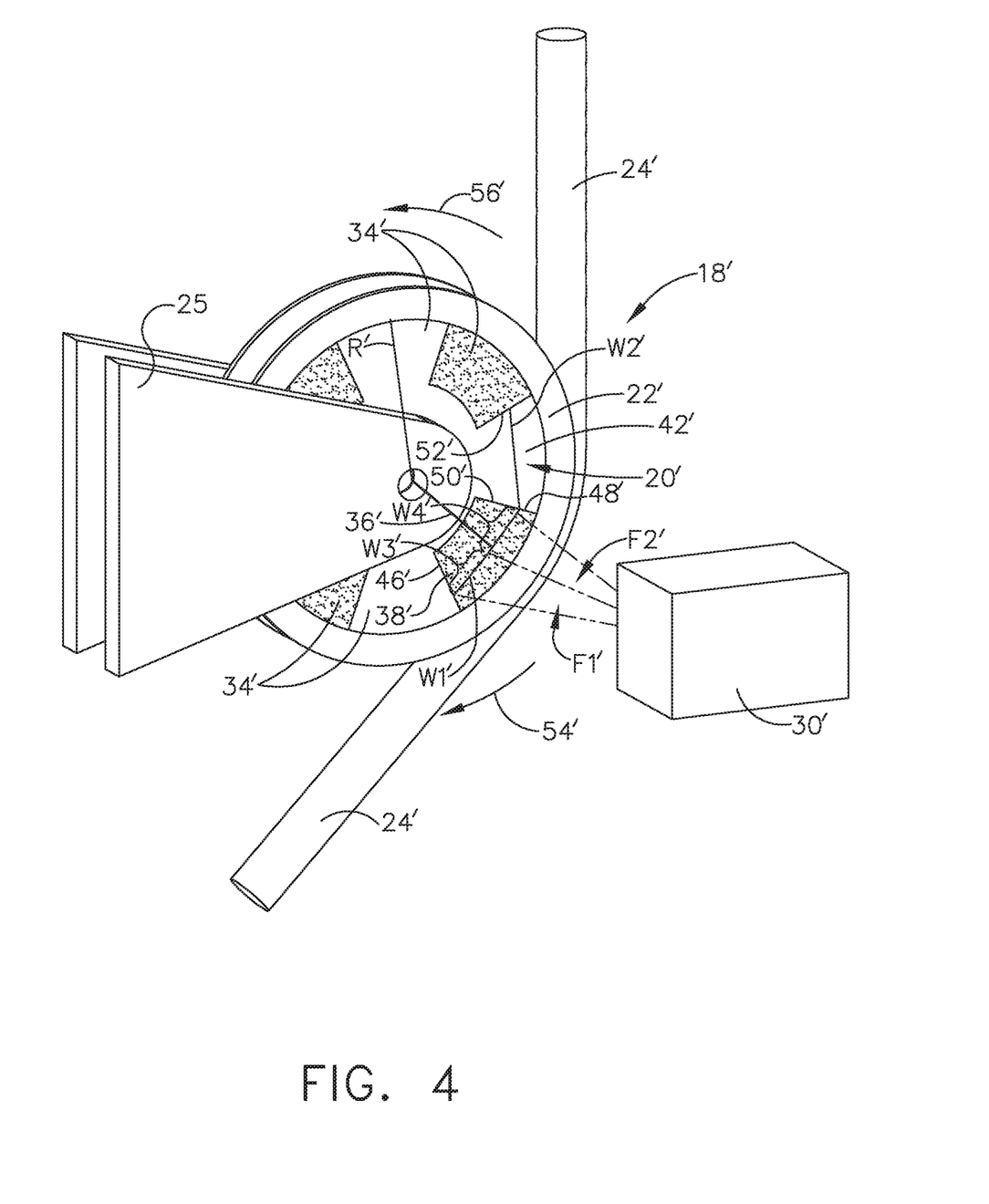
FIG. 4 is a partial perspective view of a second example of the flight control surface position sensor assembly with a cable of the flight control assembly in a first position.
Figure 5:
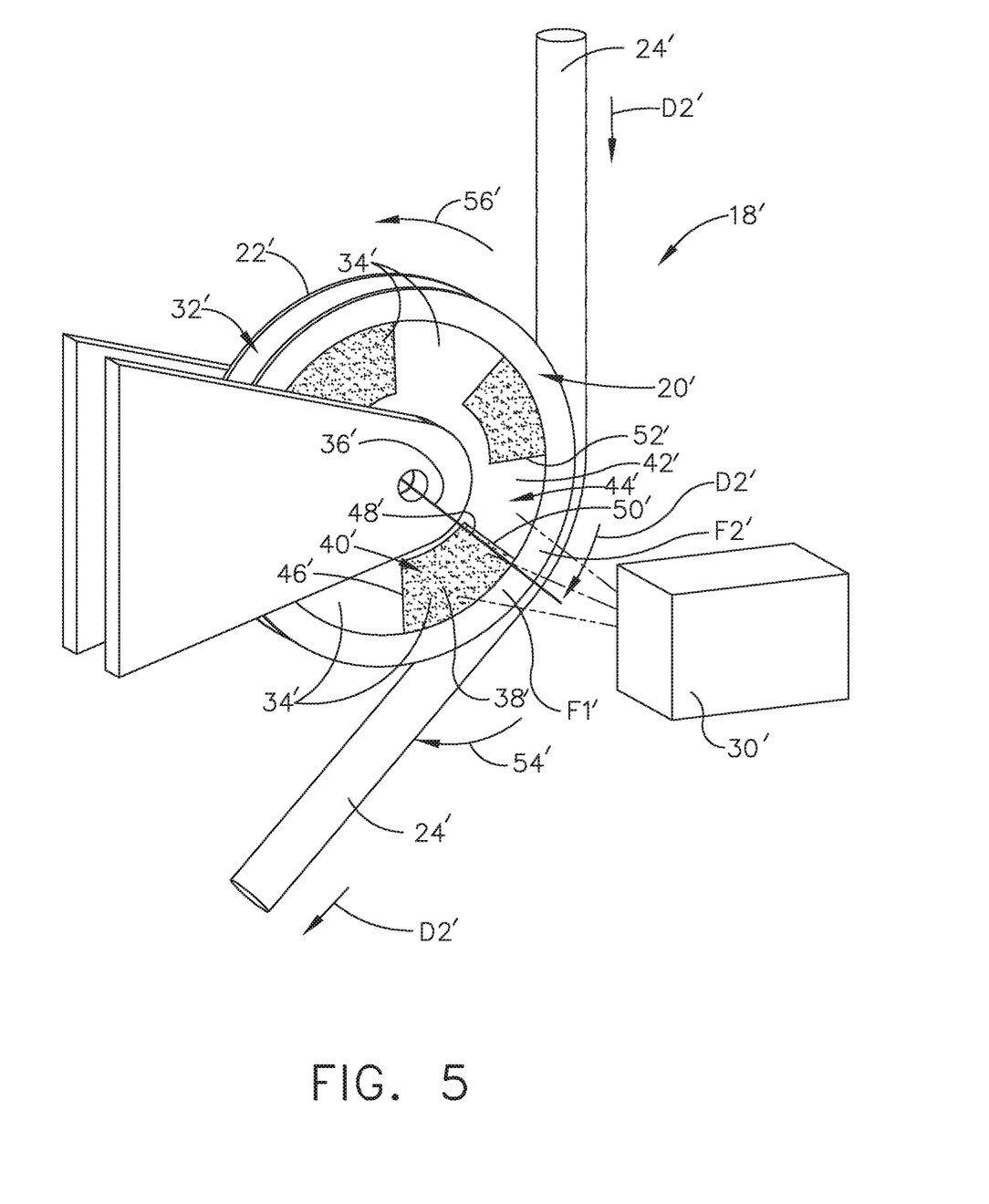
FIG. 5 is a partial perspective view of the second example of the flight control surface position sensor assembly of FIG. 4 with a cable of the flight control assembly moving from the first position.

In referring to FIGS. 4 and 5, a second example is shown of flight control surface position sensor assembly 18'. Position indicator 20' includes a plurality of adjacent portions 34' of position indicator 20' positioned circumferentially about a central axis of rotation 36' of pulley 22'. First portion 38' of the plurality of adjacent portions 34' of position indicator 20' has a magnetic field strength. Second portion 42' of the plurality of adjacent portions 34' of position indicator 20' adjacent to first portion 38' of the plurality of adjacent portions 34' has a different magnetic field strength than the magnetic field strength of first portion 38' of the plurality of adjacent portions 34'.

In this example, first portion 38' of the plurality of adjacent portions 34' includes ferromagnetic material, such as iron, cobalt or other ferromagnetic material. Second portion 42' of the plurality of adjacent portions 34' adjacent to first portion 38' of the plurality of adjacent portions 34' has an absence of ferromagnetic material in contrast to first portion 38'. The presence of a ferromagnetic material provides a magnetic field associated with first portion 38' and the absence of the ferromagnetic material provides a diminished or absence of a magnetic field in second portion 42'. This pattern of adjacent differing magnetic fields of the plurality of adjacent portions 34' is repeated about the circumference of pulley 22'.

First portion 38' of the plurality of adjacent portions 34' includes first edge 46' and second edge 48' spaced apart from first edge 46'. First and second edges 46', 48' of first portion 38' of plurality of adjacent portions 34' extend in radial direction R' relative to a central axis of rotation 36' of pulley 22'. Second portion 42' of the plurality of adjacent portions 34' includes first edge 50', which abuts and extends along second edge 48' of first portion 38' and second edge 52' spaced apart from first edge 50'. First and second edges 50', 52' of second portion 42' of the plurality of adjacent portions 34' extend in radial direction R' relative to the central axis of rotation 36' of pulley 22'. This configuration provides clear radial extending edges for the above described first and second portions 38' and 42'.

With respect to the configuration of position indicator 20', position indicator 20' in this second example can be constructed in various ways wherein plurality of adjacent portions 34' of the position indicator 20' are positioned circumferentially about central axis of rotation 36' of pulley 22' which is not constructed of a ferromagnetic material. In this example, position indicator 20' is constructed of a film which carries ferromagnetic material in first portion 38' and does not carry any ferromagnetic material in second portion 42'. The film material with the configuration of the alternating presence and absence of the plurality of adjacent portions 34' of ferromagnetic material are positioned about the central axis of rotation 36' of pulley 22' can be constructed as a decal in which the decal can be adhered to pulley 22' with a contact adhesive without altering any operational configuration of pulley 22' and/or cable 24'. Other applications of providing different magnetic fields of adjacent portions of first and second portions 38' and 42' about pulley 22' can also include securing ferromagnetic material in first portion 38' directly to a surface of pulley 22', which is not constructed of a ferromagnetic material, and provide for an absence of ferromagnetic material in adjacent second portion 42' with respect to the surface of pulley 22. This pattern of first and second portions 38' and 42' can be repeated about the circumference of pulley 22'.

As shown in FIGS. 4 and 5, position indicator 20' includes a plurality of adjacent portions 34' wherein each of the plurality of adjacent portions 34' is contrasting in magnetic field to the magnetic field of an adjacent portion 34' of the plurality of adjacent portions 34'. First portion 38' of plurality of adjacent portions 34' includes first edge 46' and second edge 48' spaced apart from first edge 46'. In this second example, first edge 46' and second edge 48' demark the edge of ferromagnetic material positioned within first portion 38'. First and second edges 46', 48' of first portion 38' of plurality of adjacent portions 34' extend in radial direction R' relative to central axis of rotation 36' of pulley 22'. Second portion 42' of the plurality of adjacent portions 34' includes first edge 50', which abuts and extends along second edge 48' of first portion 38', and second edge 52' is spaced apart from first edge 50'. In this second example, first and second edges 50', 52' demark the edge of second portion 42' with an absence of ferromagnetic material. First and second edges 50', 52' of second portion 42' of the plurality of adjacent portions 34' extend in radial direction R' relative to central axis of rotation 36' of pulley 22'. This configuration provides clear radial extending edges for first and second portions 38' and 42' with respect to the presence and absence of ferromagnetic material. First portion 38' of the plurality of adjacent portions 34' includes first width dimension W1' and second portion 42' of the plurality of adjacent portions 34' includes second width dimension W2', which are equal having the same dimension. Sensor 30' is a magnetic field sensor such as a Hall effect sensor, as seen in FIGS. 4 and 5, which includes a first magnetic sensing field F1' and a second magnetic sensing field F2' wherein first and second magnetic sensing fields F1' and F2' are positioned adjacent to one another. First magnetic sensing field F1' has a width dimension W3' equal to one half of first width dimension W1' of first portion 38' or one half of second width dimension W2' of second portion 42' and second magnetic sensing field F2' has a width dimension W4' equal to one half of first width dimension W1' of first portion 38' or one half second width dimension W2' of second portion 42'. With sensor 30' being a magnetic sensor having two adjacent magnetic sensing fields F1' and F2' including width dimension W3' and width dimension W4', which added together, equals first width dimension W1' of first portion 38' and likewise can equal second width dimension W2' of second portion 42', direction of rotation of pulley 22' can be sensed.

Sensing direction of rotation of pulley 22', for example, can be seen in FIGS. 4 and 5. With pulley 22' rotating and coming into alignment with first portion 38', as seen in FIG. 4, sensor 30' senses both fields F1' and F2' to have the same magnetic field. With sensor 30' sensing field F2' to next have a lesser magnetic field than field F1', pulley 22' as seen in FIG. 5 is moving in a clockwise direction 54'. In contrast, should sensor 30' sense field F1' to have an absence or more diminished magnetic field while sensor 30' senses the magnetic field in field F2' to be greater, pulley 22' would be sensed as rotating in a counter clockwise direction 56', as identified in FIG. 5.

As a result, with a width of each of the plurality of adjacent portions 34' known and with the above described sensing fields F1' and F2' by sensor 30' flight control surface position sensor assembly 18' can track the linear travel of cable 24' and the direction of travel of cable 24' such as in reverse direction D2' seen in FIG. 5. In addition, with calibrating a control surface position with sensor 30', the direction or travel of the control surface is sensed by sensor 30' and the amount control surface has traveled from a known position is also sensed.

Figure 6:
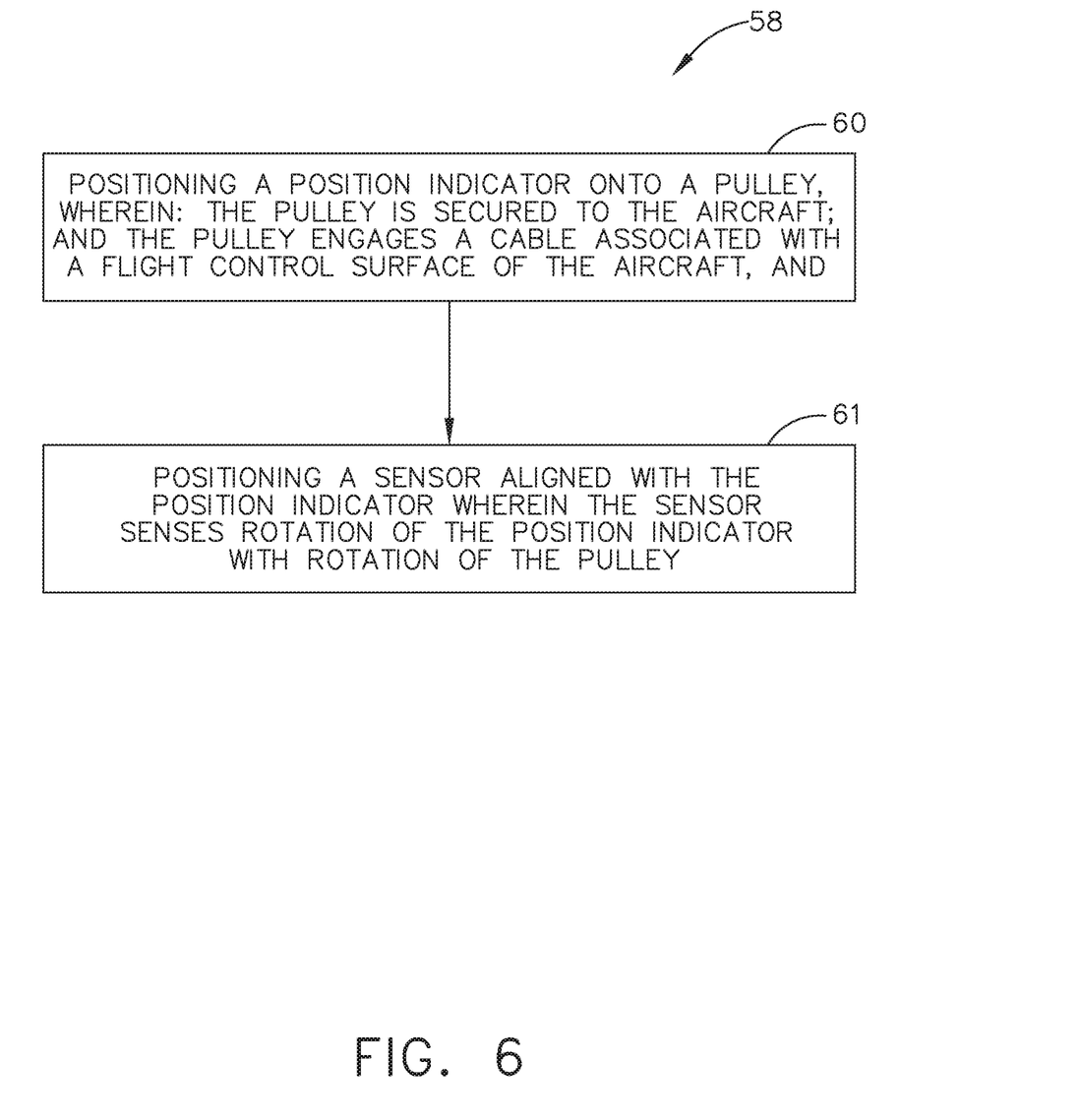
FIG. 6 is a flow chart of a method for sensing a flight control surface position of an aircraft.

In referring to FIG. 6, method 58 for sensing a flight control surface position of aircraft 10 includes step 60 of positioning a position indicator 20 onto pulley 22, wherein pulley 22 is secured to aircraft 10 and pulley 22 engages cable 24 as earlier described with groove 32 of pulley 22 and is associated with flight control surface of aircraft 10. In this example, cable 24 is connected to flight control surface such that movement of cable 24 corresponds to movement of the flight control surface. Method 58 further includes step 61 of positioning sensor 30 aligned with position indicator 20 wherein positioning sensor 30 senses rotation of position indicator 20 with rotation of the pulley 22.

Step 60 of positioning position indicator 20 onto pulley 22 includes positioning a film onto pulley 22. Positioning the film onto pulley 22 further includes positioning the film onto the pulley with the film having a plurality of adjacent portions 34 positioned circumferentially about central axis of rotation 36 of pulley 22 with a first portion 38 having a first visual appearance 40 of the plurality of adjacent portions 34 and a second portion 42 having a second visual appearance 44, which is adjacent to first portion 38. The film can in this example carry a contact adhesive for securement to pulley 22. Alternatively, positioning the film onto the pulley with the film having a plurality of adjacent portions 34' positioned circumferentially about a central axis of rotation 36' of pulley 22' wherein first portion 38' of the plurality of adjacent portions 34' has a magnetic field strength and second portion 42' of the plurality of adjacent portions 34', which is adjacent to first portion 38', has a different magnetic field strength than the magnetic field strength of first portion 38'.

Step 61 of positioning the sensor further includes positioning the sensor 30 with the first portion 38 having first visual appearance 40 and second portion 42 having second visual appearance 44, with first width dimension W1 of first portion 38 and second width dimension W2 of second portion 42 are equal having the same dimension and with sensor 30 comprises an optical sensor, which comprises a first optical sensing field F1 and a second optical sensing field F2. First and second optical sensing fields F1 and F2 are positioned adjacent to one another. Additionally, first optical sensing field F1 has a width dimension W3 equal to one half first width dimension W1 of first portion 38 or one half second width dimension W2 of second portion 42. Second optical sensing field F2 has a width dimension W4 equal to one half first width dimension W1 of first portion 38 or one half second width dimension W2 of second portion 42. Alternatively, positioning sensor 30' with first portion 38' having the magnetic field strength and second portion 42' having a different magnetic field strength from that of first portion 38'. First width dimension W1' of first portion 38' and second width dimension W2' of second portion 42' are equal having the same dimension. Sensor 30' comprises a magnetic field sensor, which comprises a first magnetic sensing field F1' and second magnetic sensing field F2' with first and second magnetic sensing fields F1' and F2' positioned adjacent to one another. Additionally, first magnetic sensing field F1' has a width dimension W3' equal to one half of first width dimension W1' of first portion 38' or one half second width dimension W2' of second portion 42'. Second magnetic sensing field F2' has a width dimension W4' equal to one half of first width dimension W1' of first portion 38' or one half second width dimension W2' of second portion 42'.

While various examples have been described above, this disclosure is not intended to be limited thereto. Variations can be made to the disclosed examples that are still within the scope of the appended claims.

What is claimed:

1. A flight control surface position sensor assembly for an aircraft, comprising:
    a position indicator positioned on a pulley, wherein:
        the position indicator comprises a plurality of adjacent portions of the position indicator positioned circumferentially about a central axis of rotation of the pulley;
        a first portion and a second portion of the plurality of adjacent portions of the position indicator has a first visual appearance and a second visual appearance, respectively in which a first width dimension of the first portion is equal to a second width dimension of the second portion;
        the pulley is secured to the aircraft; and
        the pulley engages a cable associated with a flight control surface of the aircraft; and
    a sensor which senses rotation of the position indicator with rotation of the pulley, comprises an optical sensor, which comprises a first optical sensing field and a second optical sensing field, wherein:
        the first optical sensing field has a width dimension equal to one half the first width dimension of the first portion or one half the second width dimension of the second portion; and
        the second optical sensing field has a width dimension equal to one half the first width dimension of the first portion or one half the second width dimension of the second portion.

2. The flight control surface position sensor assembly of claim 1, wherein the first visual appearance of the first portion of the plurality of adjacent portions is a first color and the second visual appearance of the second portion of the plurality of adjacent portions is a second color.

3. The flight control surface position sensor assembly of claim 1, wherein the first visual appearance of the first portion is black and the second visual appearance of the second portion is white.

4. The flight control surface position sensor assembly of claim 1, wherein:
    the first portion of the plurality of adjacent portions includes:
        a first edge and a second edge spaced apart from the first edge; and
        the first and second edges of the first portion of the plurality of adjacent portions extend in a radial direction relative to a central axis of rotation of the pulley; and
    the second portion of the plurality of adjacent portions includes:
        a first edge, which abuts and extends along the second edge of the first portion, and a second edge spaced apart from the first edge; and
        the first and second edges of the second portion of the plurality of adjacent portions extend in a radial direction relative to the central axis of rotation of the pulley.

5. The flight control surface position sensor assembly of claim 1, wherein the pulley is secured to the aircraft with a bracket permitting the pulley to rotate.

6. The flight control surface position sensor assembly of claim 1, wherein a first portion of the cable is connected to a motor for moving the cable.

7. The flight control surface position sensor assembly of claim 6, wherein a second portion of the cable is connected to the control surface.

8. The flight control surface position sensor assembly of claim 7, wherein the control surface comprises one of an aileron or a rudder.

9. The flight control surface position sensor assembly of claim 1, wherein the cable is positioned in a groove of the pulley.

10. The flight control surface position sensor assembly of claim 1, wherein a pattern comprising the first portion and the second portion is repeated about the pulley.

11. A flight control surface position sensor assembly for an aircraft, comprising:
    a position indicator positioned on a pulley, wherein:
        the position indicator comprises a plurality of adjacent portions of the position indicator positioned circumferentially about a central axis of rotation of the pulley, wherein:
            a first portion of the plurality of adjacent portions of the position indicator has a magnetic field strength; and
            a second portion of the plurality of adjacent portions of the position indicator adjacent to the first portion of the plurality of adjacent portions has a different magnetic field strength than the magnetic field strength of the first portion of the plurality of adjacent portions in which a first width dimension of the first portion and a second width dimension of the second portion are equal;
        the pulley is secured to the aircraft; and
        the pulley engages a cable associated with a flight control surface of the aircraft; and
    a sensor which senses rotation of the position indicator with rotation of the pulley comprises a magnetic field sensor with a first and a second magnetic sensing fields positioned adjacent to one another, wherein:
        the first magnetic sensing field has a width dimension equal to one half of the first width dimension of the first portion or one half the second width dimension of the second portion; and
        the second magnetic sensing field has a width dimension equal to one half of the first width dimension of the first portion or one half the second width dimension of the second portion.

12. The flight control surface position sensor assembly of claim 11, wherein the first portion comprises a ferromagnetic material and the second portion adjacent to the first portion has an absence of the ferromagnetic material.

13. The flight control surface position sensor assembly of claim 11, wherein:
    the first portion includes:
        a first edge and a second edge spaced apart from the first edge; and
        the first and second edges of the first portion extend in a radial direction relative to a central axis of rotation of the pulley; and the second portion includes:
a first edge, which abuts and extends along the second edge of the first portion, and a second edge spaced apart from the first edge; and
the first and second edges of the second portion extend in a radial direction relative to the central axis of rotation of the pulley.

14. The flight control surface position sensor assembly of claim 11, wherein the pulley is secured to the aircraft with a bracket permitting the pulley to rotate.

15. The flight control surface position sensor assembly of claim 11, wherein a first portion of the cable is connected to a motor for moving the cable.

16. The flight control surface position sensor assembly of claim 15, wherein a second portion of the cable is connected to the control surface.

17. The flight control surface position sensor assembly of claim 16, wherein the control surface comprises one of a aileron or rudder.

18. A method for sensing a flight control surface position of an aircraft, comprising the steps of:
positioning a position indicator onto a pulley, wherein:
the pulley is secured to the aircraft; and
the pulley engages a cable associated with a flight control surface of the aircraft; and
positioning a sensor aligned with the position indicator wherein the sensor senses rotation of the position indicator with rotation of the pulley, wherein:
positioning the position indicator, which has a first portion of the position indicator having a first visual appearance and has a second portion of the position indicator having a second visual appearance, such that the first portion of the position indicator has a first width dimension and the second portion has of the position indicator has a second width dimension with the first width dimension equal to the second width dimension;
the sensor comprises an optical sensor, which has a first optical sensing field and a second optical sensing field;
the first optical sensing field and the second optical sensing field are positioned adjacent to one another;
the first optical sensing field has a first width dimension equal to one half the first width dimension of the first portion of the position indicator or one half of the second width dimension of the second portion of the position indicator; and
the second optical sensing field has a second width dimension equal to one half the second width dimension of the second portion of the position indicator or one half of the second width dimension of the second portion of the position indicator; or
positioning the position indicator, which has a first portion of the position indicator having a magnetic field strength and has a second portion of the position indicator having a different magnetic field strength, such that the first portion has a first width dimension of the first portion of the position indicator and the second portion of the position indicator has a second width dimension with the first width dimension equal to the second width dimension;
the sensor comprises a magnetic field sensor, which comprises a first magnetic sensing field and a second magnetic sensing field;
the first magnetic sensing field and the second magnetic sensing field are positioned adjacent to one another;
the first magnetic sensing field has a first width dimension equal to one half of the first width dimension of the first portion of the position indicator or one half of second width dimension of the second portion of the position indicator;
the second magnetic sensing field has a second width dimension equal to one half of the first width dimension of the first portion of the position indicator or one half of the second width dimension of the of the second portion of the position indicator.

19. The method for sensing of claim 18, wherein positioning the position indicator onto the pulley includes positioning a film onto the pulley.

20. The method for sensing of claim 19, wherein positioning the film onto the pulley further includes:
positioning the film onto the pulley with the film having a plurality of adjacent portions positioned circumferentially about a central axis of rotation of the pulley with a first portion having a first visual appearance of the plurality of adjacent portions and a second portion having a second visual appearance which is adjacent to the first portion; or
positioning the film onto the pulley with the film having a plurality of adjacent portions positioned circumferentially about a central axis of rotation of the pulley, wherein:
a first portion of the plurality of adjacent portions has a magnetic field strength; and
a second portion of the plurality of adjacent portions adjacent to the first portion has a different magnetic field strength than the magnetic field strength of the first portion.

* * * * *